Sept. 19, 1967　　　A. W. GROGONO　　　3,342,201
PRESSURE DETECTING DEVICE
Filed Nov. 10, 1964

INVENTOR
ALAN WALTER GROGONO

BY Cushman, Darby & Cushman
ATTORNEYS

United States Patent Office 3,342,201
Patented Sept. 19, 1967

3,342,201
PRESSURE DETECTING DEVICE
Alan Walter Grogono, London, England, assignor to Henry Alfred Longden, Woldingham, Surrey, England
Filed Nov. 10, 1964, Ser. No. 410,093
7 Claims. (Cl. 137—112)

ABSTRACT OF THE DISCLOSURE

A device for detecting predetermined pressure variations in either of two supply lines consisting of a valve body arranged to connect fluid pressure operable indicator means with the supply lines under the control of a valve member. The latter is urged in opposite directions from an intermediate position of balance, in which the valve is closed, towards open positions, by the normal pressures in the supply lines, in which positions the indicator means is operated.

---

This invention relates to pressure detecting devices and more particularly, though not exclusively, to devices for incorporation in anaesthetic equipment in which two gases from separate supplies are administered to a patient.

In such cases it is important that the anaesthetist be promptly warned of a fall in pressure in either of the two gases and it is an object of the invention to provide a generally improved device for detecting such a pressure fall.

According to the present invention there is provided a device for detecting pressure variations in either of two fluid supply lines incorporating a valve body arranged to connect fluid pressure operable indicator and/or warning means with the said two fluid supply lines under the control of a valve member which is then urged in opposite directions from an intermediate position of balance in which the valve is closed, towards open positions by the normal pressures prevailing in the respective supply lines, whereby a variation in the pressure in either said supply line tends to open the valve and thereby operate the indicator and/or warning means.

In a preferred form of the invention the body defines two outer chambers and an intermediate chamber which houses said valve member and which is separated from the outer chambers by two apertured diaphragms respectively, the outer chambers being connectible to the two supply lines so that the diaphragms, which are then respectively responsive to the prevailing pressures, are normally urged into positions in which the diaphragm apertures are closed by the valve member, and the valve member being movable by excess pressure in one of the outer chambers away from the associated diaphragm to admit fluid into the intermediate chamber which is arranged for connection to the indicator and/or warning means.

Figure 1:
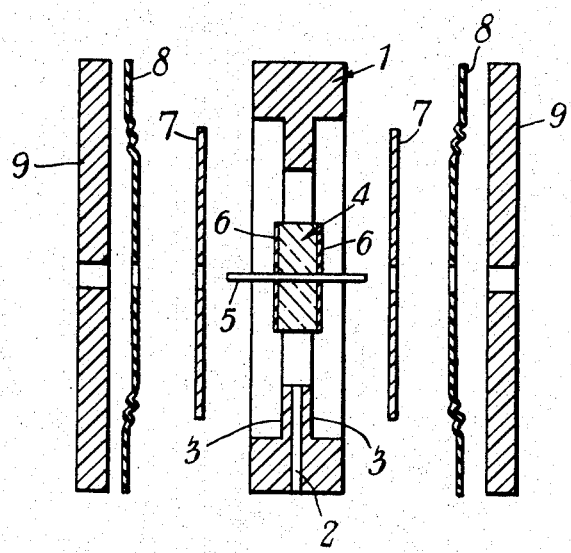
Figure 2:
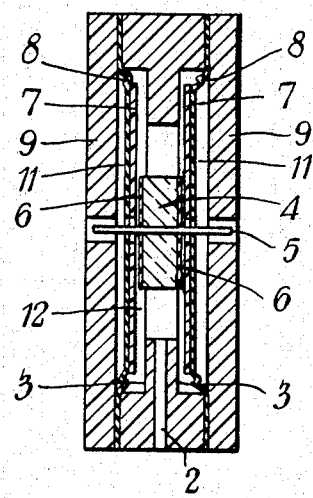

In order that the invention may be more fully understood, a device for detecting a fall in pressure in either of two gas supply lines forming part of anaesthetic equipment and supplying gas, for example, oxygen and nitrous oxide respectively, at equal pressures, will now be described, by way of example, with reference to the accompanying drawing, in which, FIGURE 1 is an exploded sectional view of the device, and FIGURE 2 shows the device illustrated in FIGURE 1 but assembled.

Referring now to the drawing, the device includes a valve housing 1 formed by axially boring a circular block of methyl methacrylate sold under the trademark Perspex, and then counter-boring the block from both end faces to a depth corresponding approximately to a third of the total block thickness. The housing is radially drilled to provide a passage 2 leading from the outer surface of the housing to a point on the inner body surface between the two shoulders 3 formed by the counter-bores. The device further includes a valve member 4 in the form of a relatively small circular glass block mounted on an axial spindle 5 and each face of this block is covered with a layer of rubber 6. The valve member is of an axial length which is slightly greater than the distance between the shoulders 3 and is supported in a position intermediate of these two shoulders, with the spindle 5 lying along the axis of the housing, by two Perspex discs 7 which fit into the two counter-bores respectively. The ends of the spindle 5 pass through clearance apertures in the respective discs 7.

The device also includes two nylon film diaphragms 8 which cover the end faces of the housing and these diaphragms are also provided with clearance apertures to pass over the spindle ends. Each diaphragm is held in place by a circular Perspex cover plate 9 having a diameter which is the same as the external diameter of the housing and the cover plates are attached to the housing by bolts (not shown) passing through registering holes in the cover plates, the diaphragms 8 and the housing, the bolts being secured by nuts in the normal way.

It will be seen that the body formed by the housing and the two cover plates defines three chambers, namely two outer chambers 11 which are each defined by a cover plate 9 and an adjacent diaphragm 8, and an intermediate chamber 12 separated by the diaphragms from the outer chambers.

The cover plates 9 are each provided with a centrally disposed union coupling (not shown) whereby one of the chambers 11 can be connected with one of the supply lines and the other chamber 11 be connected with the other supply line. Furthermore the radial passage 2 enables the intermediate chamber to be connected, by suitable means, to a pressure responsive warning and/or indicator means, or example, a simple whistle.

The arrangement of the aforementioned parts is such that equal fluid pressure in the outer chambers 11 will cause each diaphragm 8 to be distended to lay flat against the associated disc 7. The discs are thereby urged into contact with the valve member 4 so that the rubber layers on the opposite valve member faces close the apertures in these discs and in turn the apertures in the diaphragms. In this way communication between each of the outer chambers 11 and the intermediate chamber 12 is interrupted. The fact that the axial thickness of the valve member 4 exceeds slightly the distance between the shoulders 3 in the housing and the fact that the fluid pressures in the outer chambers 11 are equal, ensures that the discs 7 engage the valve member 4 and, at the same time, are equally spaced from the shoulders 3. A fall in pressure in one of the chambers 11, however, enables fluid in the other chamber to urge the particular disc 7 into contact with the associated shoulder, which provides an abutment surface, whereafter fluid pressure on the portion of the valve member 4 exposed by the aperture in that disc will move the valve member away from the disc to admit gas from the chamber having the higher pressure into the intermediate chamber 12.

In operation of the device, assume that the device has been suitably connected into the anaesthetic equipment, that is, the unions respectively connected to supply lines and the intermediate chamber 12 connected to a whistle. Upon switching on of the gas supplies, the gases will flow into their respective outer chambers 11 and the diaphragms 8 will be distended to urge the discs 7 into contact with the valve member 4 so that neither of the gases can flow into the intermediate chamber 12. However should one of the gas pressures fall, gas will flow into the intermediate chamber 12 and then out through the radial passage 2 to operate the whistle.

Whilst the foregoing device has been described as being capable of detecting a fall in pressure of one of the gases starting from equal gas pressures, that is, the device detects a pressure differential, the device can be constructed equally well to be capable of detecting a change in pressure differential. In this case the diaphragm would bear against associated discs having differing diameters so that the valve would only occupy an intermediate, balance, position, in which both apertures in the discs are closed, should the fluid pressures in the outer chambers have a predetermined relative value. However, a change in this value will cause the valve to move one way or the other depending upon the initial pressures and the direction of the change, to cause the whistle to be operated.

It will be appreciated that the whistle may be replaced by any other suitable form of pressure responsive indicator and/or warning means.

Furthermore the materials from which various components of the above device are made may be replaced by any other suitable material, aluminium, for example.

Although the housing has been described, as a composite member formed from a single block, alternatively, this may be formed from three annular discs of the same external diameter mounted coaxially side-by-side, the internal diameter of the central disc being smaller than that of the outer discs which are of equal internal diameter. The discs would then be bolted together in a fluid-tight manner.

I claim:

1. A device for detecting predetermined pressure variations in either of two supply lines, comprising a valve body defining two outer chambers and an intermediate chamber; means for respectively connecting the two outer chambers to the two supply lines and for connecting the intermediate chamber to a fluid pressure operable indicator means; a valve member in said intermediate chamber for connecting the indicator means with either one of the two supply lines; and two pressure responsive apertured diaphragms which respectively separate the two outer chambers from the intermediate chamber and which are adapted to be urged by the normal prevailing pressures in the respective supply lines into positions in which the diaphragm apertures are closed by the valve member, whereby a predetermined pressure variation in either supply line opens the valve and thereby operates the indicator means.

2. A device as set forth in claim 1, in which the valve member is a single member having opposite valve faces towards which the diaphragms are respectively arranged to be urged by the normal prevailing pressures.

3. A device as set forth in claim 2, including two apertured plates which are disposed on opposite sides respectively of said valve member and which are interposed between the valve faces and the respective diaphragms; and in which said valve body is provided with abutment surfaces with which said plates are arranged to cooperate to limit, during valve movement, movement of the diaphragm subjected to excess pressure.

4. A device as set forth in claim 3, in which the valve body incorporates two oppositely facing shoulders surrounding the valve member to provide said abutment surfaces.

5. A device as set forth in claim 3, in which the valve member comprises a glass block carrying on opposed surfaces layers of rubber constituting said valve faces.

6. A device as set forth in claim 5, in which the valve member is mounted on a spindle and each plate and associated diaphragm define registering clearance apertures receiving said spindle.

7. A device as set forth in claim 1, in which the two diaphragms are identical so that said valve member occupies said position of balance under the action of equal prevailing pressures in said supply lines.

References Cited
UNITED STATES PATENTS

| | | | |
|---|---|---|---|
| 1,371,242 | 3/1921 | Hopwood. | |
| 1,958,155 | 5/1934 | Watkins | 137—606 X |
| 2,138,989 | 12/1938 | Thomas et al. | 137—512 X |
| 2,870,776 | 1/1959 | Marsh | 137—111 X |
| 2,977,991 | 4/1961 | Bauer | 73—407 X |

STANLEY N. GILREATH, *Primary Examiner.*